Figure 1A:
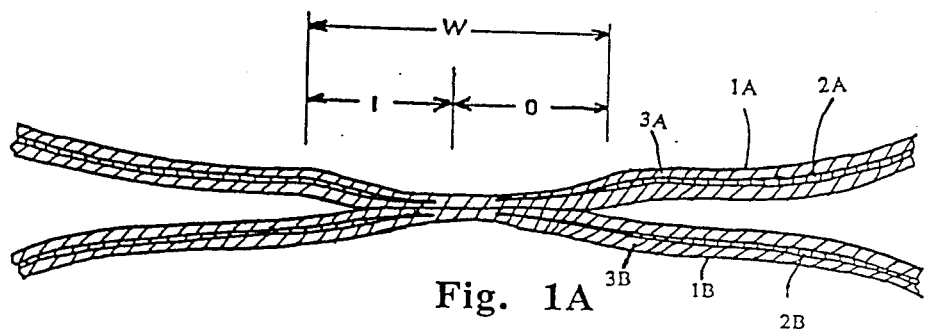

United States Patent [19]

Kawasaki et al.

[11] Patent Number: 4,763,977
[45] Date of Patent: Aug. 16, 1988

[54] OPTICAL FIBER COUPLER WITH TUNABLE COUPLING RATIO AND METHOD OF MAKING

[75] Inventors: Brian S. Kawasaki, Kanata; Masao Kawachi, Nepean; Kenneth O. Hill, Kanata; Derwyn C. Johnson, Nepean, all of Canada

[73] Assignee: Canadian Patents and Development Limited-Societe, Ottawa, Canada

[21] Appl. No.: 690,099

[22] Filed: Jan. 9, 1985

[51] Int. Cl.$^4$ .............................. G02B 6/26; G02B 6/42
[52] U.S. Cl. .................................................. 350/96.15
[58] Field of Search ..................................... 350/96.15

[56] References Cited

U.S. PATENT DOCUMENTS 4,493,528  1/1985  Shaw et al. ..................... 350/96.15

Primary Examiner—William L. Sikes
Assistant Examiner—Robert E. Wise
Attorney, Agent, or Firm—Pascal & Associates

[57] ABSTRACT

An optical coupler for single mode optical signals having a tunable (variable) coupling ratio, and a method of fabricating the coupler. A pair of virtually identical optical fibers are fused together at a narrowed waist region, each fiber being formed of a core and cladding, each being tapered toward the waist in such a manner as to ensure adiabatic propagation of light in the structure. An optical signal carried by one fiber first passes through a decreasing taper region and then passes through an increasing taper region of one or the other fiber (or both). The decreasing taper rate of the input portion of one fiber is such that the optical signal radiates out of the core (where $V=1$ locally) and into the cladding, as it approaches the waist. The increasing taper rates of the output portions of the two fibers are such that a predetermined coupling ratio is obtained. The coupler is bent in the region of the waist whereby a coupling ratio can be selected between the incoming fiber portions having the decreasing taper and the outgoing fibers having increasing tapers.

11 Claims, 2 Drawing Sheets

OPTICAL FIBER COUPLER WITH TUNABLE COUPLING RATIO AND METHOD OF MAKING

This invention relates to optical signal transmission and in particular to an optical coupler for single mode optical signals having a tunable (variable) coupling ratio, and a method of fabricating the coupler.

Optical signals are carried via light waveguides, commonly referred to as optical fibers. Each fiber is typically comprised of a core and a cladding surrounding the core. The index of refraction of the core is usually higher than that of the cladding to ensure that light transmission should occur substantially in the core. Typically transmission within the fiber occurs in one of two ways: single mode or multi-mode. Often, in the case of multi-mode fibers, the index of refraction of the fiber is graded from the core to the cladding to enhance bandwidth of transmission. In contrast, single mode fibers are more typically step indexed in refractive index profile.

Optical signal networks often require couplers in which an incoming optical signal can be switched to one of a pair of output optical signal transmission paths. The present invention relates to an optical coupler for single mode excited fibers. The single mode coupler is unidirectional and uses biconical taper sections, and has a coupling ratio which is variable under external control.

The present invention also relates to a method of forming the coupler, in which the biconical nature of the fibers in the coupling region is maintained; the method provides a distortion-free welding of the fibers in the coupler. This improvement leads directly to superior couplers.

Optical couplers have been known for some time. However the known biconical taper couplers operate differently from the present invention resulting in their inability to provide a variable coupling ratio in a coupler using single mode fibers, which is the result in the present invention.

U.S. Pat. No. 3,931,518 to Miller describes a coupler involving the extraction an optical signal to a bulk transparent section and then to a detector. Light is extracted from a multi-mode fiber to the bulk transparent section, rather than from a single mode fiber. U.S. Pat. No. 4,019,051 relates to a bidirectional version of the Miller invention device. While pressure on the fiber is used to effect coupling, the pressure controls the amount of the mode conversion obtained.

U.S. Pat. No. 4,307,933 to Palmer et al relates to a multi-mode assymmetric fiber coupler.

U.S. Pat. No. 4,336,047 to Pavlopoulos describes the use of multi-mode fiber biconical taper couplers which appears to be useful for single mode coupling, but the provision of a variable coupling ratio as in the present invention is not achieved.

Pavlopoulos describes the use of metal oxide material incorporated in, on, or about the fibers prior to fusing them. The use of this material is described for the purpose of slowing the fusion process. In addition, the material arises the surface tension of the glass fiber material. In contrast, in one embodiment of the present invention finely particulated doped quartz soot is used as a bonding agent, which is compatible with the glass fiber material and speeds the fusing process, absorbing heat and wetting the fibers. Thus in this embodiment the present invention has precisely the opposite effect from Pavlopoulos. The result is a coupler having lower loss than the Pavlopoulos coupler.

U.S. Pat. No. 4,008,061 to Ramsey describes a form of single mode fiber coupler, but not a fused biconical form as in the present invention. The patented structure cannot be tuned in coupling ratio in the same way as the present invention.

U.S. Pat. No. 4,264,126 to Sheem describes the use of a "bottle coupler", a single mode fiber coupler which is different form of coupler from the fused biconical coupler. The Sheem coupler uses etching to near the fiber core in order to achieve coupling. The fabrication process and final form are different from the structure of the present invention.

According to one embodiment of the present invention, two similar optical fibers are hard fused together. To aid the achievement of fusing a mixture of high purity ethanol and silica soot can be applied to a predetermined length of each of the optical fibers. Heat is applied, whereby the silica soot (if used) wets the fibers, fusing the cladding together. The fibers are then pulled while the heat is applied to the fused portion; the fused portion is thereby narrowed to define a waist. As the fibers are pulled, the diameter of the cladding and the core at the waist reduce, the diameter of the core portion reducing to virtually zero. The fibers taper toward the waist on each side. At a predetermined waist diameter, tension is stopped and the fibers are allowed to cool.

The fibers are mounted on a base or retainer and bent in a U or S-shape. The characteristic switching radius of the U or S is determined by applying light through an input fiber and fixing it in a position at which slightly varying the radius causes the light to switch to output either one or the other fiber, but does not cause an undue increase in the coupler's excess loss. By varying the bending radius, a variable coupling ratio between the fibers is achieved.

In accordance with an embodiment of the invention, an optical fiber coupler is provided, comprising a pair of virtually identical optical fibers fused together at a narrowed waist region, each fiber being formed of a core and cladding, each being tapered toward the waist in such a manner as to ensure adiabatic propagation of light in the structure. An optical signal carried by one fiber first passes through a decreasing taper region and then passes through an increasing taper region of one or the other fiber (or both). The decreasing taper rate of the input portion of one fiber is such that the optical signal radiates out of the core (where $V = 1$ locally) and into the cladding, as it approaches the waist. The increasing taper rates of the output portions of the two fibers are such that a predetermined coupling ratio is obtained. The coupler is bent in the region of the waist whereby a coupling ratio can be selected between the incoming fiber portions having the decreasing taper and the outgoing fibers having increasing tapers.

According to a further embodiment of the invention, an unidirectional optical fiber coupler is provided comprising a pair of virtually identical fibers each comprised of a core and cladding, the cladding of one being fused to the other at a narrow waist portion in which the diameters of both the core and the cladding are narrowed. The rates of taper to the waists are adiabatic, and the diameters of the cores and cladding in the region of the waist portion are such that: $V \leq 1$ where $$V = \frac{2\pi a}{\lambda} \sqrt{n^2_{\text{core}} - n^2_{\text{cladding}}},$$

in which

V is the normalized frequency of the coupler (dimensionless), a is the (local) radius of the core, λ is the wavelength of an optical signal passing through the coupler, and $n_{core}$ and $n_{cladding}$ are the indices of refraction of the core and cladding respectively, but V for the waveguide formed by the air-cladding interface is greater at the coupler waist than a value in which the antisymmetric transmission mode of the signal carried in the cladding radiates out of the cladding.

It is important to note that in contrast to all of the prior art structures, in the present invention single mode transmission in one fiber is converted to multi-mode at the waist region where for the fiber core waveguide $V \leq 1$, that is, where the optical signal radiates out of the core into the cladding, to be carried by the cladding, and can then couple almost entirely into the cladding of the adjacent fiber depending on the relative indices of refraction and the radii of the cores and cladding, the taper angles and the structure length as well as the refractive index of the medium surrounding the entire structure. In the increasing taper portion of one or the other fibers the optical signal carried in the cladding is converted back adiabatically in the taper to single mode transmission carried by the core of the fiber.

It should be noted that while each of the fibers is to all intents and purposes identical to the other with identical indices of refraction, the indices of refraction vary at the point of bend due to the stresses induced therein. The cladding of one fiber will be under relative compression while the cladding in the other will be under relative tension, thus effecting variation in the indices of refraction.

Figures 1B, 1C:
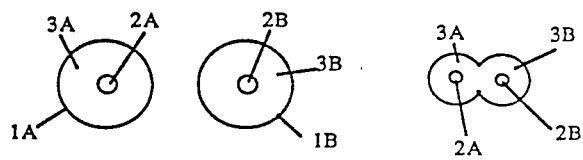
Figure 4:
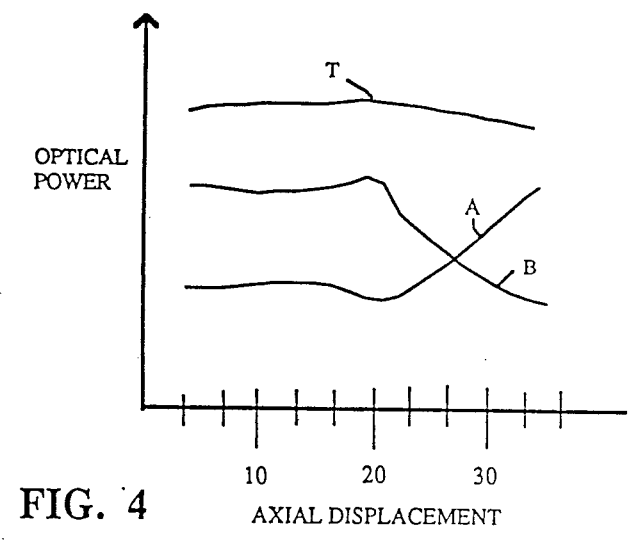
Figure 2:
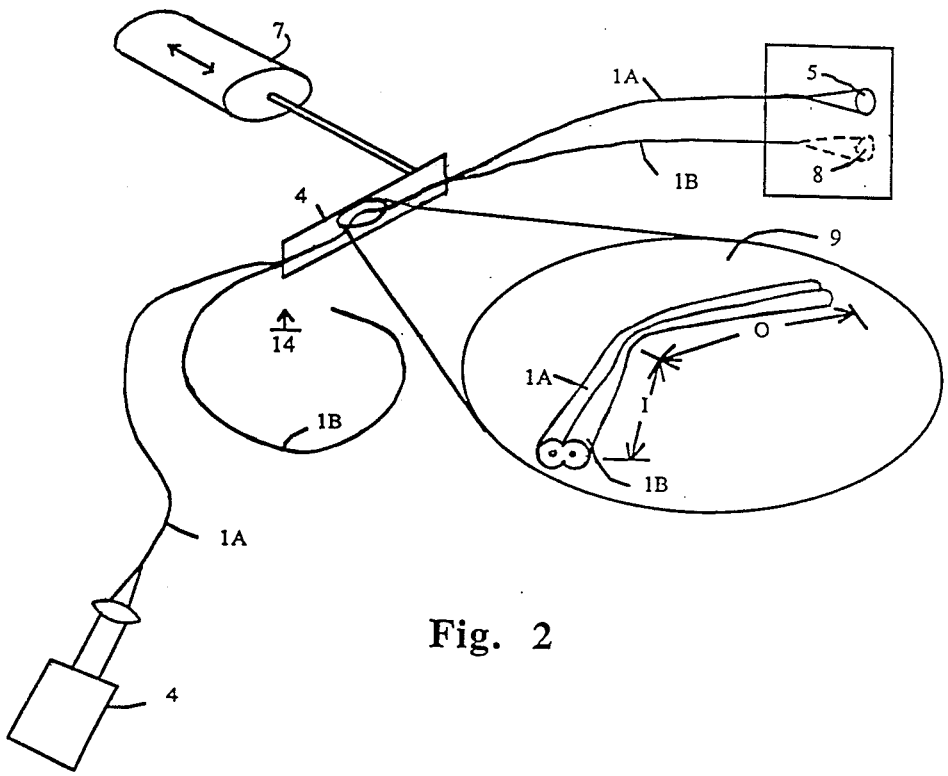
Figure 3:
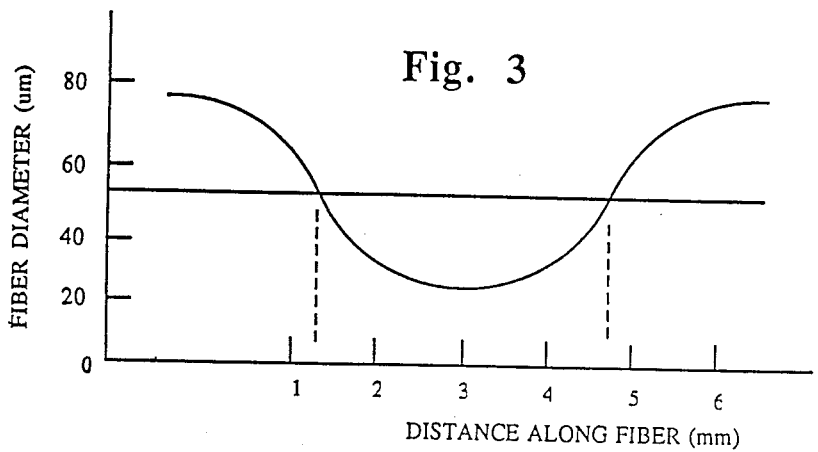

A better understanding of the invention will be obtained by reference to the detailed description below in conjunction with the following drawings, in which:

FIG. 1A illustrates the cross section of a fiber coupler used in the present invention, FIG. 1B illustrates an axial cross section of a pair of fibers prior to fusing, FIG. 1C illustrates the cross section of a pair of fused fibers at the waist section, FIG. 2 is a schematic representation of a single mode fiber coupler with a tunable coupling ratio in accordance with the present invention, FIG. 3 is a graph of fiber diameter against the length of the coupler, and FIG. 4 is a graph of optical power realized in each output portion of the fibers of the coupler against axial displacement as the coupler is bent.

Turning first to FIG. 1A, an elongated cross section of the fiber coupler according to the present invention is shown. A pair of fibers 1A and 1B are each comprised of a core 2A and 2B respectively each covered by a cladding 3A and 3B respectively. A waist portion, generally shown by portion W, is fused together gently. This is effected for ease of fabrication by applying a mixture of silica soot in high purity ethanol to the surfaces of the fibers, holding them together, and heating the waist section. Silica soot can be made by chemical vapour deposition (CVD), a well known process. It is preferred that the silica soot should be doped with boron, in order that its melting temperature should be lowered below that of the silicon optical fibers. In addition, the index of refraction of the soot should be less than that of the cladding in order to retain the optical signal within the cladding.

The fibers are then heated and pulled to form a biconical taper coupler. An optical signal is applied, and pulling is continued until overcoupling is obtained. Referring to FIG. 1 and expansion view 9 of FIG. 2, assuming that an optical signal is applied to one fiber and arrives in the fiber from the left, it must pass through a decreasing taper region I followed by an increasing taper region O in one or both of output portions of the fibers to the right.

FIG. 1B illustrates the two identical fibers 1A and 1B prior to fusing and narrowing at the waist, and being comprised of cores 2A and 2B and cladding 3A and 3B.

FIG. 1C illustrates a cross section of the waist portion of the fused fibers in which several significant aspects of the invention can be observed. The diameters of the claddings 3A and 3B have been reduced from the diameters in FIG. 1B. The diameters of the cores 2A and 2B have been reduced to virtually nil (indeed, they can be reduced to nil). Further, the fibers have been hard fused, that is, they have retained substantially their original profile. Soft fusing would have changed the overall profile to the structure similar to an ellipse or dumb-bell shape, while in the present invention the entire circular profile of each of the fibers has been retained. The biconical nature of the coupler is thus preserved in the present invention.

The coupler is cooled and is bent into a broad U-shape or S-shape until minimum or zero coupling is obtained from the first to the second fiber. In some cases the S-shaped bend may be out of alignment with the plane of the fibers. The bent coupler is mounted (either prior to or after bending), and by straightening the coupler the coupling ratio can be varied.

It should be noted that in case depressed cladding fibers are used to form the couplers, the tapered and waist portions of the fibers should be etched to remove the outer cladding in the area of the fiber strand where fusion will take place, prior to the step of applying the silicon soot.

FIG. 2 illustrates an embodiment which demonstrates the invention. A He-Ne laser 4 provides light at its characteristic wavelength into one end of fiber 1A. A coupler 14 is fabricated as described earlier with fiber 1B, the bent portion (also seen in expansion view 9) being mounted on a flat spring base 4. The end of fiber 1A emits a light spot 5 on a screen 6. A micrometer 7 or equivalent apparatus is used to bend the spring 4, thus straightening or otherwise stressing the bend in the coupler. The light is coupled in the coupler from fiber 1A to fiber 1B, thus dimming light spot 5 and illuminating light spot 8. The degree of energy coupled between fibers 1A and 1B can in this way be dynamically varied by micrometer 7.

Micrometer 7 can of course be replaced by a solenoid, a piezo-electric crystal, or any other controllable apparatus which can provide a bending stress or a change in refractive index at the waist of the coupler.

While on the surface there may appear to be many similarities to prior art structures, there are highly significant aspects which cause the present invention to differ substantially in structure, operation and result from that of the prior art.

It was pointed out earlier that the present invention is directed to optical waveguides in single mode excitation. It should be noted that the decreasing taper portion of the coupler I causes the signal input fiber core to radiate into its cladding. This is believed to excite a combination of the two lowest order modes of the entire fused-cladding waveguide structure. The dephasing of these two modes in effect transfers power from the input fiber cladding region of the waveguide structure to the adjacent fiber cladding region in the coupler. The coupling ratio is determined by the phase difference between the odd and even modes during recapture in the increasing taper region of the coupler.

The present structure and mode of operation thus differs significantly from those couplers of the prior art, in which coupling is achieved through evanescent wave coupling between cores.

The decreasing taper rate of the input fiber must be such that the optical signal radiates out of the core and into the cladding with minimal loss of light from the structure. The increasing taper rate of the output portions of both fibers must be such that a predetermined coupling ratio is obtained. In the increasing taper portion the optical signal is converted back to single mode, and is carried by the core of the output portion of the selected fiber, or of both fibers.

The rates of taper to the waists must be adiabatic that is, the spot size must grow gradually within the fiber, but must stay within the cladding.

For the above effect to be achieved, it has been determined that the normalized frequency V for the core-guided light must be equal to or smaller than unity in the structure, i.e. $V \leq 1$ where $$V = \frac{2\pi a}{\lambda} \sqrt{n^2_{core} - n^2_{cladding}},$$

where

V is the normalized cut-off frequency of the coupler (and is dimensionless), a is the (local) radius of the core, $\lambda$ is the wavelength of an optical signal passing through the coupler, and $n_{core}$ and $n_{cladding}$ are the indices of refraction of the core and cladding respectively.

It should also be noted, that V for the waveguide formed by the air-cladding interface should be greater at the coupler waist than a value in which the antisymmetric transmission mode of the cladding waveguide radiates out of the cladding.

The result is radiation of the symmetric mode out of the core and into the cladding but the antisymmetric cladding mode remains bound. In the region of the coupler in which the symmetric mode and antisymmetric modes of the cladding propagate, the ambient (air or coating) surrounding the cladding forms an external cladding to the fiber. In the region of the waist, where the signal is carried in the cladding, the core can disappear as it plays no part in the transmission of the signal.

The above limitations ensure that coupling is effected from cladding to cladding, and that there is no evanescent coupling between core and core as in the prior art couplers.

Various typical wavelengths carried by the fiber used to make the coupler are e.g. 0.85 microns, 1.3 microns or 1.5 microns, in the $HE_{11}$ mode. Typical fiber dimensions are core radius of about 3 to 10 microns and cladding radius of about 75 to 150 microns (prior to etching). Typical indices of refraction are 1.451 for the core and 1.44 for the cladding.

FIG. 3 illustrates a fiber profile in the region of the coupler in a successful prototype. The normalized cut-off frequency V (defined as V=1) of the core, where the transition from core transmission to cladding transmission or vice versa, may be observed over a length of about 3¾ millimeters (the length demarcated by the positions X—X along the abscissa).

FIG. 4 is a graph illustrating the measured optical power carried by a pair of fibers of a laboratory prototype of a coupler in accordance with the present invention as the coupler is bent (or the radius of curvature of a bent coupler is straightened). Curve A illustrates the optical power carried by one fiber while curve B illustrates the optical power carried by the second. Curve T illustrates the total power, which, it may be seen, is nearly a constant. The shapes of the two curves illustrate that one is virtually the reciprocal of the other. It may also be seen that over a substantial portion of the curve a variable coupling ratio is achieved.

Clearly the present invention constitutes a substantial advance in the art, providing a single mode fiber biconical taper coupler which has a controllable, variable coupling ratio, and which does not use core to core coupling as in prior art couplers.

A person skilled in the art understanding this invention may now conceive of variations in design using the principles described herein. All are considered to be within the sphere and scope of this invention as defined in the claims appended hereto.

We claim:

1. A unidirectional optical fiber coupler comprising a pair of virtually identical optical fibers each comprised of a core and cladding and being fused together at a narrow tapered waist, each fiber being tapered toward and away from the waist, means for translating an optical signal in single mode and carried by one fiber in the core at one side of the waist to multi-mode carried by the cladding at least adjacent the narrowest portion of the waist, and for translating the signal in multi-mode to single mode carried by the core of either said one or the other fiber or both fibers at the other side of the waist.

2. An optical fiber coupler as defined in claim 1 in which the coupler is bent in the region of the waist.

3. An optical fiber coupler as defined in claim 2 further including means for varying the angle of bending of said coupler whereby the optical signal is selectively switched whereby it is carried by either one of said one or the other of said fibers on the other side of the waist.

4. An optical fiber coupler as defined in claim 3 including means for restraining the fibers in either one of a U or S curve in which the waist is within the curve, and means for varying the radius of the curve, whereby the optical signal is switched and is substantially coupled from said one to the other of the fibers.

5. An optical fiber coupler as defined in claim 3 in which the rates of taper of the fibers in the region of said waist are adiabatic, the minimum diameters and the refractive indices of the cores and cladding in the region of the waist portion being such that: $V \leq 1$ where $$V = \frac{2\pi a}{\lambda} \sqrt{n^2_{core} - n^2_{cladding}},$$

in which

V is the normalized frequency (local) of the coupler (dimensionless), a is the (local) radius of the core, λ is the wavelength of an optical signal passing through the coupler and $n_{core}$ and $n_{cladding}$ are the indices of refraction of the core and cladding respectively, but that V associated within the waveguide formed by the air-cladding interface is greater than a value in which the antisymmetric transmission mode of the cladding waveguide radiates out of the cladding.

6. An optical fiber coupler as defined in claim 2 including means for restraining the fibers in either one of a U or S curve in which the waist is within the curve, and means for varying the radius of the curve, whereby the optical signal is switched and is substantially coupled from said one to the other of the fibers.

7. An optical fiber coupler as defined in claim 2 in which the rates of taper of the fibers in the region of said waist are adiabatic, the minimum diameters and the refractive indices of the cores and cladding in the region of the waist portion being such that: $V \leq 1$ where $$V = \frac{2a}{\lambda} \sqrt{n^2_{core} - n^2_{cladding}},$$

in which

V is the normalized frequency (local) of the coupler (dimensionless), a is the (local) radius of the core, λ is the wavelength of an optical signal passing through the coupler and $n_{core}$ and $n_{cladding}$ are the indices of refraction of the core and cladding respectively, but that V associated within the waveguide formed by the air-cladding interface is greater than a value in which the antisymmetric transmission mode of the cladding waveguide radiates out of the cladding.

8. An optical fiber coupler as defined in claim 1 in which the rates of taper are adiabatic, the minimum diameters and the refractive indices of the cores and cladding in the region of the waist portion being such that: $V \leq 1$ where $$V = \frac{2\pi a}{\lambda} \sqrt{n^2_{core} - n^2_{cladding}},$$

in which

V is the normalized frequency (local) of the coupler (dimensionless), a is the (local) radius of the core, λ is the wavelength of an optical signal passing through the coupler and $n_{core}$ and $n_{cladding}$ are the indices of refraction of the core and cladding respectively, but that V associated within the waveguide formed by the air-cladding interface is greater than a value in which the antisymmetric transmission mode of the cladding waveguide radiates out of the cladding.

9. A unidirectional optical fiber coupler comprising a pair of virtually identical fibers each comprised of a core and cladding, the cladding of one being fused to the cladding of the other at a narrow waist portion in which the diameters of both the core and the cladding are narrowed, being tapered adiabatically to the waist region, the diameters of the refractive indices of the cores and cladding in the region of the waist portion being such that for the fiber core waveguide: $V \leq 1$ where $$V = \frac{2\pi a}{\lambda} \sqrt{n^2_{core} - n^2_{cladding}},$$

in which:

V is the normalized frequency (local) of the coupler (dimensionless), a is the (local) radius of the core, λ is the wavelength of an optical signal passing through the coupler and, $n_{core}$ and $n_{cladding}$ are the indices of refraction of the core and cladding respectively, but that V associated with the waveguide formed by the air-cladding interface is greater than a value in which the antisymmetric transmission mode of the cladding waveguide radiates out of the cladding.

10. A coupler as defined in claim 9 further including means for bending the coupler to selectively couple an optical signal passing along one fiber into the other.

11. An optical fiber coupler as defined in claim 10 including means for restraining the fibers in either one of a U or S curve in which the waist is within the curve, the radius or radii of curvature of the curve being selected whereby an optical signal passing through one of the fibers is substantially coupled to a predetermined one or the other of the fibers, and means for varying the radius of the curve, whereby the optical signal is switched and is substantially coupled to the other of the fibers.

* * * * *